United States Patent
Foo et al.

(10) Patent No.: US 8,721,770 B2
(45) Date of Patent: May 13, 2014

(54) CARBON DIOXIDE REMOVAL AND IONIC LIQUID COMPOUNDS USEFUL THEREIN

(75) Inventors: Thomas Foo, Wilmington, DE (US); Mark Andrew Harmer, Landenberg, PA (US); Keith W. Hutchenson, Lincoln University, PA (US); Christopher P. Junk, Wilmington, DE (US); Berlyn R. Mellein, Wilmington, DE (US); Aaron Minter, Wilmington, DE (US); Mark Brandon Shiflett, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 186 days.

(21) Appl. No.: 13/131,079

(22) PCT Filed: Dec. 4, 2009

(86) PCT No.: PCT/US2009/066804
§ 371 (c)(1), (2), (4) Date: Aug. 19, 2011

(87) PCT Pub. No.: WO2010/065873
PCT Pub. Date: Jun. 10, 2010

(65) Prior Publication Data
US 2011/0296993 A1  Dec. 8, 2011

Related U.S. Application Data

(60) Provisional application No. 61/119,783, filed on Dec. 4, 2008.

(51) Int. Cl.
*B01D 53/14* (2006.01)

(52) U.S. Cl.
USPC ............... 95/236; 423/228; 252/60; 252/184

(58) Field of Classification Search
USPC ......................................................... 95/236
See application file for complete search history.

(56) References Cited

U.S. PATENT DOCUMENTS

| | | | |
|---|---|---|---|
| 2,403,319 A | 7/1946 | Williams | |
| 4,095,962 A | 6/1978 | Richards | |
| 4,139,597 A | 2/1979 | Kohler | |
| 4,820,672 A | 4/1989 | Mehta | |
| 5,608,105 A | 3/1997 | Fitzpatrick | |
| 5,859,263 A | 1/1999 | Ghorpade et al. | |
| 6,054,611 A | 4/2000 | Farone et al. | |
| 6,155,057 A | 12/2000 | Angell | |
| 6,579,343 B2 | 6/2003 | Brennecke | |
| 6,818,593 B2 | 11/2004 | Manzer | |
| 6,900,337 B2 | 5/2005 | Manzer et al. | |
| 7,153,996 B2 | 12/2006 | Fagan et al. | |
| 7,157,588 B2 | 1/2007 | Harmer | |
| 7,208,605 B2 | 4/2007 | Davis | |
| 7,214,358 B2 | 5/2007 | Ravary | |
| 7,435,318 B2 | 10/2008 | Arlt | |
| 7,625,941 B2 | 12/2009 | Harmer | |
| 7,749,475 B2 | 7/2010 | Kim | |
| 8,119,818 B2 | 2/2012 | Foo | |
| 8,138,354 B2 | 3/2012 | Foo | |
| 8,313,558 B2 | 11/2012 | Shiflett | |
| 8,536,371 B2 | 9/2013 | Davis | |
| 8,549,857 B2 | 10/2013 | Papile | |
| 2005/0129598 A1 | 6/2005 | Chinn | |
| 2006/0197053 A1 | 9/2006 | Shiflett | |
| 2006/0235249 A1* | 10/2006 | Harmer et al. | ................ 585/422 |
| 2007/0028774 A1 | 2/2007 | Rochelle | |
| 2007/0131535 A1 | 6/2007 | Shiflett | |
| 2007/0264180 A1 | 11/2007 | Carrette | |
| 2008/0028777 A1 | 2/2008 | Boesmann | |
| 2008/0236390 A1 | 10/2008 | Anders | |
| 2009/0235817 A1 | 9/2009 | Gu | |
| 2009/0293503 A1 | 12/2009 | Vandor | |
| 2010/0101231 A1 | 4/2010 | Westmeier | |
| 2010/0294131 A1 | 11/2010 | Bade | |
| 2011/0000221 A1 | 1/2011 | Minta | |
| 2011/0079017 A1 | 4/2011 | Gulen | |
| 2011/0105782 A1 | 5/2011 | Masi | |
| 2011/0203301 A1 | 8/2011 | Foo | |
| 2012/0130088 A1 | 5/2012 | Foo | |
| 2012/0312020 A1 | 12/2012 | Hume | |

FOREIGN PATENT DOCUMENTS

| | | |
|---|---|---|
| EP | 503910 | 9/1992 |
| JP | 09/000875 | 1/1997 |
| WO | WO 2007/012143 | 2/2007 |
| WO | WO 2007/073201 | 6/2007 |
| WO | WO 2010/010238 | 1/2010 |
| WO | WO 2010/010239 | 1/2010 |

OTHER PUBLICATIONS

Keri A. Tallman et al, "Phospholipid-Protein Adducts of Lipid Peroxidation: Synthesis and Study of New Biotinylated Phosphatidylcholines", Chemical Res. Toxicology, 2007, V. 20, pp. 227-234.

J. Cardoso et al, "Synthesis, Characterization, and Thermal and Dielectric Zwitterionic Pendant Groups", J. Polymer Science, Part B, Polymer Physics, 1997, V. 35 (3), 479-488.

Baldwin et al, Capturing $CO_2$: Gas Compression vs. Liquifaction, *Power Magazine*, Jun. 1, 2009, Online Print.

Bates et al, $CO_2$ Capture by a Task Specific Ionic Liquid, 124 *Journal Am. Chem. Society Communications*, No. 6, pp. 926-927, Jan. 19, 2002, Online Print.

Enderby, Ionic Liquids: Recent Progress and Remaining Problems, 5 *J. Phys. Condens. Matter*, pp. B99-B106, 1993, IOP Publishing, London.

(Continued)

*Primary Examiner* — Duane Smith
*Assistant Examiner* — Joubert X Glover

(57) ABSTRACT

This invention relates to compounds useful as ionic liquids that are based on an N-substituted pyrrolidinone and incorporate a pendant ammonium cation that is spaced from the pyrrolidone ring by a variable length linker; and to methods of carbon dioxide removal in which they may be used.

20 Claims, No Drawings

(56) References Cited

OTHER PUBLICATIONS

Gutkowski et al, Amine-Functionalized Task-Specifc Ionic Liquids: A Mechanistic Explanation for the Dramatic Increase in Viscosity upon Complexation with $CO_2$ from Molecular Simulation, 130 *Journal Am. Chem. Society Articles*, 14690-14704, Oct. 11, 2008, Online Print.

Karimi et al, Investigation of Intercooling Effect in $CO_2$ Capture Energy Consumption, 4 *Energy Procedia*, pp. 1601-1607, 2011, Elsevier, Online Print.

Romeo et al, Optimization of Intercooling Compression in $CO_2$ Capture Systems, 29 *Applied thermal Engineering*, pp. 1744-1751, 2009, Elsevier, Online Print.

Scach et al, Exergoeconomic Analysis of Post Combustion $CO_2$ Capture Process, $20^{th}$ European Symposium on Computer Aided Process Engineering, 2010, Elsevier, New York.

Welton, Room-Temperature Ionic Liquids—Solvents for Synthesis and Catalysis, 99 *Chem. Rev.* 2071-2083, Jul. 7, 1999, Online Print.

\* cited by examiner

CARBON DIOXIDE REMOVAL AND IONIC LIQUID COMPOUNDS USEFUL THEREIN

This application claims priority under 35 U.S.C. §119(e) from, and claims the benefit of, U.S. Provisional Application No. 61/119,783, filed Dec. 4, 2008, which is by this reference incorporated in its entirety as a part hereof for all purposes.

TECHNICAL FIELD

This invention relates to N-substituted pyrrolidonium compounds that are useful as ionic liquids, and to methods of carbon dioxide removal to which they may be applied.

BACKGROUND

There is increasing interest in methods to reduce or capture $CO_2$ from many different gaseous mixtures. $CO_2$ is an undesired component that is present in many gas streams such as natural gas and effluent gases, and there is also much global interest in reducing $CO_2$ emissions from combustion exhaust for the prevention of global warming. $CO_2$ can be removed or captured by many means, such as physical or chemical absorption of the gas by a liquid or solid.

Currently, a common method of carbon dioxide capture from process streams in industrial complexes involves the use of aqueous solutions of alkanolamines, but usually on a small scale. The process has been used commercially since the early 1930s (see, for example, Kohl and Nielsen, *Gas Purification*, 5th Edition, Gulf Publishing, Houston Tex., 1997), and is based on the reaction of a weak base (alkanolamine) with a weak acid ($CO_2$) to produce a water-soluble salt. This reaction is reversible, and the equilibrium is temperature dependent.

The use of alkanolamines as absorbents for $CO_2$ (from power plant flue gases, for example) is somewhat disadvantaged in respect of the amount of energy needed to regenerate the $CO_2$-rich solvent, the size of the $CO_2$ capture plant, and the loss of alkanolamines to the environment. Among conventional alkanolamines, monoethanolamine (MEA) is considered an attractive solvent at low partial pressures of $CO_2$ because it reacts at a rapid rate and the cost of the raw materials is low compared to that of secondary and tertiary amines. The costs of absorption processes using MEA are high, however, because of the high energy consumption in regeneration, and because of operation problems such as corrosion, solvent loss and solvent degradation. Furthermore, MEA can be loaded up to only 0.5 mol of $CO_2$/mol of MEA, or 33 mol %, as a result of the stable carbonates formed.

Physical absorption systems have advantages over chemical absorption such as lower energy costs, but also have disadvantages such as solvent losses and low $CO_2$ capacity. A need thus remains for systems and materials capable of providing low-cost, high-capacity methods of $CO_2$ capture.

SUMMARY

This invention provides compounds represented by the structure of the following Formula I:

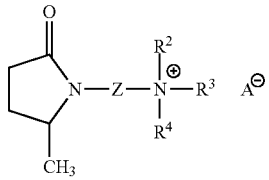

Formula I wherein (a) Z is $—(CH_2)_n—$, wherein n is an integer from 2 to 12, or Z is $—[(CH_2)_b—O]_c—(CH_2)_d—$ wherein b and d are each independently integers from 1 to 4, and c is an integer from 1 to 8;

(b) $R^2$ and $R^3$ are each independently H or a $C_1$ to $C_6$ straight-chain or branched alkyl group;

(c) $R^4$ is H, a $C_1$ to $C_6$ straight-chain or branched alkyl group, or $—[(CH_2)_p—X]_q—(CH_2)_r—Y—R^6$ wherein X and Y are each independently O or $NR^6$, p and r are each independently an integer from 1 to 4, q is an integer from 0 to 8, and $R^6$ is H or a $C_1$ to $C_6$ straight-chain or branched alkyl group; and (d) $A^-$ is an anion selected from the group consisting of levulinate, $[BF_4]^-$, $[PF_6]^-$, $[SbF_6]^-$, $[CH_3CO_2]^-$, $[HSO_4]^-$, $[CF_3SO_3]^-$, $[HCF_2CF_2SO_3]^-$, $[CF_3HFCCF_2SO_3]^-$, $[CF_3—O—CFHCF_2SO_3]^-$, $[CF_3CF_2OCFHCF_2SO_3]^-$, $[CF_3CF_2CF_2OCFHCF_2SO_3]^-$, $[HCClFCF_2SO_3]^-$, $[(CF_3SO_2)_2N]^-$, $[AlCl_4]^-$, $[CF_3CO_2]^-$, $[NO_3]^-$, $[SO_4]^{2-}$, $Cl^-$, $Br^-$, $I^-$, and $F^-$.

This invention also provides a method for the removal of $CO_2$ from a gaseous mixture by contacting the gaseous mixture with one or more compounds represented by the structure of the following Formula I:

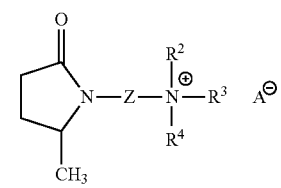

Formula I wherein (a) Z is $—(CH_2)_n—$, wherein n is an integer from 2 to 12, or Z is $—[(CH_2)_b—O]_c—(CH_2)_d—$ wherein b and d are each independently integers from 1 to 4, and c is an integer from 1 to 8;

(b) $R^2$ and $R^3$ are each independently H or a $C_1$ to $C_6$ straight-chain or branched alkyl group;

(c) $R^4$ is H, a $C_1$ to $C_6$ straight-chain or branched alkyl group, or $—[(CH_2)_p—X]_q—(CH_2)_r—Y—R^6$ wherein X and Y are each independently O or $NR^6$, p and r are each independently an integer from 1 to 4, q is an integer from 0 to 8, and $R^6$ is H or a $C_1$ to $C_6$ straight-chain or branched alkyl group; and (d) $A^-$ is an anion selected from the group consisting of levulinate, $[BF_4]^-$, $[PF_6]^-$, $[SbF_6]^-$, $[CH_3CO_2]^-$, $[HSO_4]^-$, $[CF_3SO_3]^-$, $[HCF_2CF_2SO_3]^-$, $[CF_3HFCCF_2SO_3]^-$, $[CF_3—O—CFHCF_2SO_3]^-$, $[CF_3CF_2OCFHCF_2SO_3]^-$, $[CF_3CF_2CF_2OCFHCF_2SO_3]^-$, $[HCClFCF_2SO_3]^-$, $[(CF_3SO_2)_2N]^-$, $[AlCl_4]^-$, $[CF_3CO_2]^-$, $[NO_3]^-$, $[SO_4]^{2-}$, $Cl^-$, $Br^-$, $I^-$, and $F^-$.

Ionic liquids (ILs) are well suited for use in $CO_2$-capture systems for a variety of reasons including the fact that they are regarded as potentially environmentally-benign solvents due to their immeasurably low vapor pressure, which essentially eliminates the opportunity for solvent release to the atmosphere.

DETAILED DESCRIPTION

This invention relates to compounds that are derived, in part, from N-substituted pyrrolidones. These compounds include an anion, and a cation in which there is a pendant ammonium cation spaced from a pyrrolidone ring by a variable length linker This linker is denominated Z in the description of Formula I as set forth herein. These compounds are useful as ionic liquids, and can be used for example as a solvent, as a catalyst for various kinds of reactions (such as an alkylation reaction), and as an absorbent for various gases (such as $CO_2$). These compounds also have the advantage that the cationic portion, and some of the associated anions, may be readily prepared from levulinic acid, or levulinic acid derivatives, which may be obtained from the hydrolysis of inexpensive renewable biomass feedstocks.

In the description of the compositions hereof, the following definitional structure is provided for certain terminology as employed variously in the specification:

An "alkyl" group is a monovalent (i.e. having a valence of one) group having the general Formula $C_nH_{2n+1}$.

"Biomass" refers to any cellulosic or lignocellulosic material, and includes materials containing cellulose, and optionally further includes hemicellulose, lignin, starch, oligosaccharides and/or monosaccharides. Biomass may also include additional components such as proteins and/or lipids. Biomass suitable for use herein may be derived from a single source, or may be a mixture derived from more than one source. Such sources include without limitation bioenergy crops, agricultural residues, municipal solid waste, industrial solid waste, sludge from paper manufacture, yard waste, wood and forestry waste. Examples of biomass include without limitation corn grain, corn cobs, crop residues such as corn husks, corn stover, grasses, wheat, wheat straw, hay, rice straw, switchgrass, waste paper, sugar cane bagasse, sorghum, soy, residue from the milling of grain, trees, branches, roots, leaves, wood chips, sawdust, shrubs and bushes, vegetables, fruits, flowers and animal manure.

A "catalyst" is a substance that affects the rate of a reaction but not the reaction equilibrium, and emerges from the reaction chemically unchanged.

"Conversion" refers to the weight percent of a particular reactant that is converted in a reaction to product.

A "hydrocarbyl" group is a monovalent group containing only carbon and hydrogen.

An "ionic liquid" is an organic salt that is fluid at or below about 100° C.

A "levulinate" ion is an anion represented by the structure of the following formula:

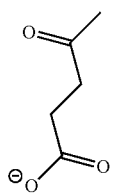

A "metal catalyst" is a catalyst that includes at least one metal, at least one Raney® metal, compounds thereof or combinations thereof. A supported metal catalyst is a supported catalyst in which the catalyst agent is a metal.

A "metal promoter" is a metallic compound that is added to a catalyst to enhance the physical or chemical function thereof in a reaction. A metal promoter can also be added to retard undesirable side reactions and/or affect the rate of the reaction.

A "promoter" is an element of the periodic table that is added to a catalyst to enhance the physical or chemical function thereof in a reaction. A promoter can also be added to retard undesirable side reactions and/or affect the rate of the reaction.

"Pyrrolidinone" is used herein synonymously with the term "pyrrolidone"; "pyrrolidin-2-one" is used synonymously with the term "2-pyrrolidone".

"Selectivity" refers to the weight percent of a particular reaction product in the total weight of the product of a reaction (including the weight of unreacted reactants).

This invention provides compounds represented by the structure of the following Formula 1:

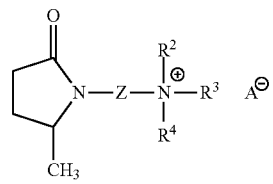

Formula I wherein (a) Z is $-(CH_2)_n-$, wherein n is an integer from 2 to 12, or Z is $-[(CH_2)_b-O]_c-(CH_2)_d-$ wherein b and d are each independently integers from 1 to 4, and c is an integer from 1 to 8; (b) $R^2$ and $R^3$ are each independently H or a $C_1$ to $C_6$ straight-chain or branched alkyl group; (c) $R^4$ is H, a $C_1$ to $C_6$ straight-chain or branched alkyl group, or is $-[(CH_2)_p-X]_q-(CH_2)_r-Y-R^6$ wherein X and Y are each independently O or $NR^6$, p and r are each independently an integer from 1 to 4, q is an integer from 0 to 8, and $R^6$ is H or a $C_1$ to $C_6$ straight-chain or branched alkyl group; and (d) $A^-$ is an anion selected from the group consisting of levulinate, $[BF_4]^-$, $[PF_6]^-$, $[SbF_6]^-$, $[CH_3CO_2]^-$, $[HSO_4]^-$, $[CF_3SO_3]^-$, $[HCF_2CF_2SO_3]^-$, $[CF_3HFCCF_2SO_3]^-$, $[CF_3-O-CFHCF_2SO_3]^-$, $[CF_3CF_2OCFHCF_2SO_3]^-$, $[CF_3CF_2CF_2OCFHCF_2SO_3]^-$, $[HCClFCF_2SO_3]^-$, $[(CF_3SO_2)_2N]^-$, $[AlCl_4]^-$, $[CF_3CO_2]^-$, $[NO_3]^-$, $[SO_4]^{2-}$, $Cl^-$, $Br^-$, $I^-$, and $F^-$.

In various embodiments, n in Z may be an integer from 2 to 6, and is frequently 2. In other embodiments, $R^2$ and $R^3$ may each independently be H, $-CH_3$, $-CH_2CH_3$ or $-CH_2CH_2CH_3$, and frequently $R^2$ is $-CH_3$ and $R^3$ is $-CH_2CH_2CH_3$. In other embodiments, c may be 1, 2, 3, 4, 5, 6 7 or 8; and b and d may each independently be 1, 2, 3 or 4. In other embodiments, p and r are each independently 1, 2, 3 or 4, more typically 2. In other embodiments, q is 0, 1, 2, 3, 4, 5, 6, 7 or 8, more typically 0. In other embodiments, X and Y are both O, or X and Y are both $NR^6$, or one of X and Y is O, and the other of X and Y is $NR^6$; more typically Y is O. In other embodiments, $R^6$ is H, $R^2$ and $R^3$ are $-CH_3$, $R^4$ is $-(CH_2)_2-O-(C_2H_5)$, $-(CH_2)_2-O-(CH_3)$, or $(CH_2)_2-OH$; and $A^-$ is levulinate, $[CF_3HFCCF_2SO_3]^-$, or $[(CF_3SO_2)_2N]^-$.

A compound hereof may be synthesized from a pyrrolidin-2-one as represented by the structure of the following Formula 2, wherein Z, $R^2$ and $R^3$ are as defined above.

Formula 2

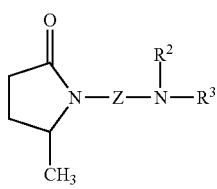

Synthesis of an N-hydrocarbyl pyrrolidin-2-one

The pyrrolidin-2-one may be synthesized by contacting levulinic acid, or an ester thereof, with a diamine of the Formula $R^2R^3N$—Z—$NH_2$ in the presence of hydrogen gas and a catalyst according to Reaction (I):

Reaction (I)

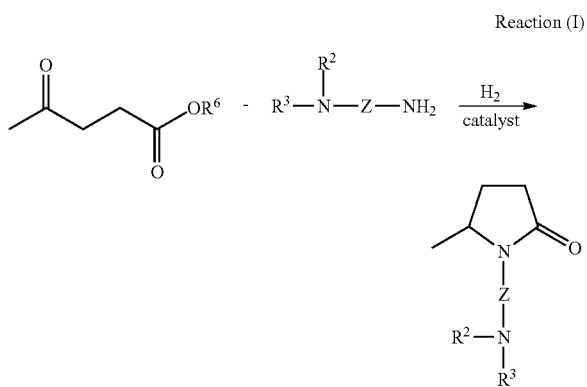

wherein Z, $R^2$ and $R^3$ are as defined above, and $R^5$ is H, —$CH_3$, —$CH_2CH_3$, or a $C_3$ to $C_8$ straight-chain or branched alkyl group. In another embodiment, the pyrrolidin-2-one may be synthesized by contacting a salt of levulinic acid, such as ammonium levulinate, with a diamine of the Formula $R^2R^3N$—Z—$NH_2$ in the presence of hydrogen gas and a catalyst. In various embodiments, in a diamine suitable for use herein, $R^2$ and $R^3$ may each independently be H, —$CH_3$, —$CH_2CH_3$ or a $C_3$ to $C_6$ straight-chain or branched alkyl group. Diamines having the formula $R^2R^3N$—Z—$NH_2$ wherein, for example, Z is —[$(CH_2)_b$—O$]_c$—$(CH_2)_d$, and c is 2, may be prepared according to Tallman et al, *Chem. Res. Toxicol.*, 2007, 20 (227-234 and Suppl.).

The pyrrolidin-2-one formed in Reaction (I) can be synthesized according to methods and conditions as taught in or adapted from U.S. Pat. No. 6,818,593 or 6,900,337, each of which is by this reference incorporated in its entirety as a part hereof for all purposes. For the synthesis of a pyrrolidin-2-one according to Reaction (I), a molar ratio of diamine to levulinic acid, or a salt or ester thereof, at the start of the reaction may be about 0.01/1 to about 100/1, or about 0.3/1 to about 5/1. The temperature range for this reductive amination reaction may be from about 25° C. to about 300° C., or about 75° C. to about 200° C. The pressure may be in the range of from about 0.3 MPa to about 20.0 MPa, or from about 1.3 MPa to about 7.6 MPa. The reaction may be performed in a non-reacting solvent medium such as water or an alcohol, ether or pyrrolidone. Alternatively, an excess of diamine can also act as a reaction medium.

The principal component of a catalyst suitable for use in Reaction (I) may be selected from metals from the group consisting of palladium, ruthenium, rhenium, rhodium, iridium, platinum, nickel, cobalt, copper, iron, osmium; compounds thereof; and combinations thereof. A chemical promoter may augment the activity of the catalyst. The promoter may be incorporated into the catalyst during any step in the chemical processing of the catalyst constituent. Suitable promoters for this process include metals selected from tin, zinc, copper, gold, silver, and combinations thereof. The preferred metal promoter is tin. Other promoters that can be used are elements selected from Group 1 and Group 2 of the Periodic Table.

The catalyst may be supported or unsupported. A supported catalyst is one in which the active catalyst agent is deposited on a support material by a number of methods such as spraying, soaking or physical mixing, followed by drying, calcination and if necessary, activation through methods such as reduction or oxidation. Materials frequently used as a support are porous solids with high total surface areas (external and internal) that can provide high concentrations of active sites per unit weight of catalyst. A catalyst support may enhance the function of the catalyst agent.

The catalyst support useful herein can be any solid, inert substance including without limitation oxides such as silica, alumina and titania; barium sulfate; calcium carbonate; and carbons. The catalyst support can be in the form of powder, granules, pellets, or the like. A preferred support material is selected from the group consisting of carbon, alumina, silica, silica-alumina, silica-titania, titania, titania-alumina, barium sulfate, calcium carbonate, strontium carbonate, compounds thereof and combinations thereof. Supported metal catalysts can also have supporting materials made from one or more compounds. More preferred supports are carbon, titania and alumina. Further preferred supports are carbons with a surface area greater than 100 $m^2$/g. A further preferred support is carbon with a surface area greater than 200 $m^2$/g. Preferably, the carbon has an ash content that is less than 5% by weight of the catalyst support, where the ash content is the inorganic residue (expressed as a percentage of the original weight of the carbon) which remains after incineration of the carbon.

The preferred content of a metal catalyst in a supported catalyst is from about 0.1 wt % to about 20 wt % of the supported catalyst based on metal catalyst weight plus the support weight. A more preferred metal catalyst content range is from about 1 wt % to about 10 wt % of the supported catalyst. Combinations of metal catalyst and support may include any one of the metals referred to herein with any of the supports referred to herein. Preferred combinations of metal catalyst and support include palladium on carbon, palladium on calcium carbonate, palladium on barium sulfate, palladium on alumina, palladium on titania, platinum on carbon, platinum on alumina, platinum on silica, iridium on silica, iridium on carbon, iridium on alumina, rhodium on carbon, rhodium on silica, rhodium on alumina, nickel on carbon, nickel on alumina, nickel on silica, rhenium on carbon, rhenium on silica, rhenium on alumina, ruthenium on carbon, ruthenium on alumina and ruthenium on silica. Further preferred combinations of metal catalyst and support include palladium on carbon, palladium on alumina, palladium on titania, platinum on carbon, platinum on alumina, rhodium on carbon, rhodium on alumina, ruthenium on carbon and ruthenium on alumina.

A catalyst that is not supported on a catalyst support material is an unsupported catalyst. An unsupported catalyst may be platinum black or a Raney® (W. R. Grace & Co., Columbia Md.) catalyst. Raney® catalysts have a high surface area as a result of preparation by the selective leaching of an alloy containing the active metal(s) and a leachable metal (usually aluminum). Raney® catalysts have high activity due to the higher specific area and allow the use of lower temperatures in hydrogenation reactions. The active metals of Raney® catalysts include nickel, copper, cobalt, iron, rhodium, ruthenium, rhenium, osmium, iridium, platinum, palladium; compounds thereof; and combinations thereof. Promoter metals may also be added to the base Raney® metals to affect selectivity and/or activity of the Raney® catalyst. Promoter metals for Raney® catalysts may be selected from transition metals from Groups IIIA through VIIIA, IB and IIB of the Periodic Table of the Elements. Examples of promoter metals include chromium, molybdenum, platinum, rhodium, ruthenium, osmium and palladium, typically at about 2% by weight of the weight of the total metal.

Levulinic acid for use herein may be obtained from biomass. For the conversion of biomass to levulinic acid, biomass may be contacted with water and an acid catalyst in a train of one or more reactors, preferably under pressure at elevated temperature. This basic process is described, for example, in U.S. Pat. Nos. 5,608,105, 5,859,263, 6,054,611 and 7,153,996, each of which is by this reference incorporated in its entirety as a part hereof for all purposes. Generally, cellulose in the biomass is converted to levulinic acid and formate in one or more reactors. Levulinic acid produced from biomass may also be converted to levulinic acid esters for example as described in U.S. Pat. No. 7,153,996 through the reaction of levulinic acid with olefins.

Suitable diamines for use in Reaction (I) may, for example, be obtained commercially from suppliers such as Huntsman (Houston Tex.) or BASF (Mount Olive N.J.), or may be synthesized by methods such as those discussed in Eller and Henkes, *Diamines and Polyamines* [in Chapter 8 of *Ullmanns Encyclopedia of Industrial Chemistry* (2002), Wiley-VCH Verlag GmbH & Co.], or Chapter 22 in *Experimental Methods in Organic Chemistry*, 3$^{rd}$ Edition [Moore, Dalrymple and Rodig (Eds.), (1982) Saunders College Publishing, N.Y.].

The formation of a pyrrolidin-2-one may be carried out in batch, sequential batch (i.e. a series of batch reactors) or in continuous mode in equipment such as that discussed in Fogler, *Elementary Chemical Reaction Engineering*, 2$^{nd}$ Edition [(1992), Prentice-Hall, Inc., N.J., USA]. A pyrrolidin-2-one synthesized according to Reaction (I) may be recovered, for example, by distillation, or by filtration to remove solid acid catalyst particles, if present.

Conversion of the N-hydrocarbyl pyrrolidin-2-one

A compound hereof may be synthesized by quaternizing the non-ring nitrogen of the pyrrolidin-2-one to obtain a quaternary ammonium compound as represented by the structure of the following Formula 3:

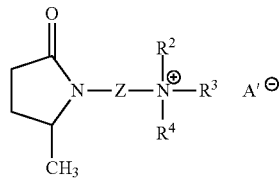

Formula 3 wherein Z, $R^2$, $R^3$ and $R^4$ are each as defined above, and $A'^-$ is selected from the group consisting of $Cl^-$, $Br^-$ and $I^-$.

To form a quaternary ammonium compound as described above, the pyrrolidin-2-one is contacted with an alkylating halide having the Formula $R^4$-A wherein $R^4$ is selected from the group consisting of a $C_1$ to $C_6$ straight-chain or branched alkyl group, and $A'^-$ is selected from the group consisting of $Cl^-$, $Br^-$ and $I^-$. Compounds of the formula $R^4$-A' can be obtained commercially, or can be prepared by methods such as those discussed in U.S. Pat. Nos. 2,913,496, 4,820,672 or 6,136,586; Cardoso et al, *J. Polymer Sci.*, Part B: Polymer Physics (1997), 35(3), 479-488; or Lermit et al, *J. of the Chem. Soc.* (1947), 530-3.

The quaternization reaction may be carried out in an inert solvent such as acetonitrile, acetone or dichloromethane. The quaternization may be accomplished by refluxing of the reactants, optionally under an inert atmosphere. When the reactants are hygroscopic, it is preferable to carry out the quaternization reaction, and/or the anion exchange reaction described below, under conditions that exclude water and air. The alkylating halide is present in slight excess (e.g. about 5 wt % excess) at the start of the reaction. The reaction may be carried out at a temperature in the range of from about 10° C. to about 100° C.; or in the range of from about 30° C. to about 90° C.; or in the range of from about 60° C. to about 90° C. The time for the reaction is generally from about 1 minute to about 72 hours, or about 30 minutes to about 24 hours. Methods for performing quaternization reactions suitable for use for such purpose are further discussed in sources such as *Organic Chemistry* [Morrison and Boyd (ed.) 3$^{rd}$ Edition (1973); Allyn and Bacon, Inc., Boston; Chapter 23.5, pages 752-753].

Anion Exchange

The quaternary ammonium compound thus formed is next contacted with $M^+A^-$, wherein M is selected from the group consisting of H, Li, K, Na, Ag, Mg, Ca, Ce, Ba, Rb and Sr, and $A^-$ is an anion selected from the group consisting of $[BF_4]^-$, $[PF_6]^-$, $[SbF_6]^-$, $[CH_3CO_2]^-$, $[HSO_4]^-$, $[NO_3]^-$, $[CF_3SO_3]^-$, $[HCF_2CF_2SO_3]^-$, $[CF_3{-}O{-}CFHCF_2SO_3]^-$, $[CF_3CF_2OCFHCF_2SO_3]^-$, $[CF_3CF_2CF_2OCFHCF_2SO_3]^-$, $[CF_3HFCCF_2SO_3]^-$, $[HCClFCF_2SO_3]^-$, $[(CF_3SO_2)_2N]^-$, $[AlCl_4]^-$, $[CF_3CO_2]^-$, $[NO_3]^-$, $[SO_4]^{2-}$, $Cl^-$, $Br^-$, $I^-$, $F^-$ and levulinate to form a compound hereof according to the choice of anion desired. Prior to the exchange reaction, excess alkylating agent may be removed, for example, by evaporation. In addition, the quaternary ammonium compound may be washed with a solvent and dried prior to anion exchange.

The anion exchange reaction may be carried out by mixing the quaternary ammonium compound with $M^+A^-$, optionally under an inert atmosphere. The anion exchange reaction may be carried out at a temperature in the range of from about −20 C to about 100° C. for a time of about 1 second to about 72 hours. Solvents useful in the reaction should be inert to the reactants and products, and include, for example, methanol, ethanol, acetone and/or acetonitrile. Choice of the solvent or mixture thereof will facilitate separation of the compound containing the desired anion from the remainder of the reaction mixture. Additional techniques that may enhance the anion exchange reaction include as ultrasonication as discussed in WO 03/048078.

Fluoroalkyl sulfonate anions suitable for used in the anion exchange reaction may be synthesized from perfluorinated terminal olefins or perfluorinated vinyl ethers generally according to the methods discussed in Koshar et al [J. Am. Chem. Soc. (1953) 75:4595-4596], U.S. Ser. No. 06/276,670 and U.S. Ser. No. 06/276,671. In one embodiment, sulfite and bisulfite are used as a buffer in place of bisulfite and borax, and in another embodiment, the reaction is carried out in the absence of a radical initiator. The product of the anion exchange reaction may be recovered by a technique such as evaporation of the reaction solvent under reduced pressure, decantation and/or filtration to remove precipitated salts.

1,1,2,2-Tetrafluoroethanesulfonate, 1,1,2,3,3,3-hexafluoropropanesulfonate, 1,1,2-trifluoro-2-(trifluoromethoxy)

ethanesulfonate, and 1,1,2-trifluoro-2-(pentafluoroethoxy) ethanesulfonate may be synthesized according to modifications of Koshar in which a mixture of sulfite and bisulfite is used as the buffer, and freeze drying or spray drying isolates the crude 1,1,2,2-tetrafluoroethanesulfonate and 1,1,2,3,3,3-hexafluoropropanesulfonate products from the aqueous reaction mixture, acetone is used to extract the crude 1,1,2,2-tetrafluoroethanesulfonate and 1,1,2,3,3,3-hexafluoropropanesulfonate salts; and 1,1,2-trifluoro-2-(trifluoromethoxy)ethanesulfonate and 1,1,2-trifluoro-2-(pentafluoroethoxy)ethanesulfonate are crystallized from the reaction mixture by cooling.

The compounds hereof are useful as ionic liquids, and are in general fluid at or below a temperature of about 100° C. The physical and chemical properties of an ionic liquid are influenced by the choice of cation. For example, increasing the chain length of one or more of the alkyl chains of the cation will affect properties such as the melting point, hydrophilicity/lipophilicity, density, viscosity, and solvation strength of the ionic liquid. Effects of the choice of cation and anion on the physical and chemical properties of an ionic liquid are further discussed in sources such as Wasserscheid and Keim [*Angew. Chem. Int. Ed.*, 39, 3772-3789 (2000)] and Sheldon [*Chem. Commun.*, 2399-2407 (2001)]. The compounds hereof may be utilized in one-phase systems or multiple-phase systems as a solvent, as a catalyst for various kinds of reactions (such as an alkylation reaction), and, as further described below, they are particularly useful as an absorbent for various gases (such as $CO_2$).

Each of the formulae shown herein describes each and all of the separate, individual compounds that can be assembled in that formula by (1) selection from within the prescribed range for one of the variable radicals, substituents or numerical coefficents while all of the other variable radicals, substituents or numerical coefficents are held constant, and (2) performing in turn the same selection from within the prescribed range for each of the other variable radicals, substituents or numerical coefficents with the others being held constant. In addition to a selection made within the prescribed range for any of the variable radicals, substituents or numerical coefficents of only one of the members of the group described by the range, a plurality of compounds may be described by selecting more than one but less than all of the members of the whole group of radicals, substituents or numerical coefficents. When the selection made within the prescribed range for any of the variable radicals, substituents or numerical coefficents is a subgroup containing (i) only one of the members of the whole group described by the range, or (ii) more than one but less than all of the members of the whole group, the selected member(s) are selected by omitting those member(s) of the whole group that are not selected to form the subgroup. The compound, or plurality of compounds, may in such event be characterized by a definition of one or more of the variable radicals, substituents or numerical coefficents that refers to the whole group of the prescribed range for that variable but where the member(s) omitted to form the subgroup are absent from the whole group.

In various embodiments of this invention, an ionic liquid may be formed by selecting any of the individual cations described or disclosed herein, and by selecting to pair therewith any of the individual anions described or disclosed herein, and the ionic liquid(s) thus formed may be used for any of the purposes disclosed herein such as carbon dioxide absorption. Correspondingly, in yet other embodiments, a subgroup of ionic liquids may be formed by selecting a subgroup of any size of cations, taken from the total group of cations described and disclosed herein in all the various different combinations of the individual members of that total group, and pairing therewith a subgroup of any size of anions, taken from the total group of anions described and disclosed herein in all the various different combinations of the individual members of that total group. In forming an ionic liquid, or a subgroup of ionic liquids, by making selections as aforesaid, the ionic liquid or subgroup will be formed in the absence of the members of the group of cations and/or anions that are omitted from the total group thereof to make the selection, and, if desirable, the selection may thus be made in terms of the members of the total group that are omitted from use rather than the members of the group that are included for use.

$CO_2$ Absorption

In another embodiment hereof, there are provided methods for removal of CO2 from a gaseous mixture in which it is contained. The compounds described herein are thus useful for separation methods such as $CO_2$ absorption, adsorption, or other types of recovery. This can be accomplished by contacting a gaseous mixture containing $CO_2$ with one or more of the compounds represented by the structure of Formula I, as defined above. The gaseous mixture containing $CO_2$ can be any mixture of which $CO_2$ is a constituent part, or can be 100% $CO_2$. Examples of gaseous mixtures containing $CO_2$ include without limitation flue gases, combustion exhausts, natural gas streams, streams from rebreathing apparatus, and the products of chemical synthesis, degradation or fermentation operations.

Contacting ionic liquid(s) with a gaseous mixture containing $CO_2$ may be accomplished by any means that promotes intimate mixing of the ionic liquid(s) with the source gas and is conducted for a time sufficient to allow significant removal of the targeted component(s). Thus, systems maximizing surface area contact are desirable. The conditions at which the process are conducted vary according to the compounds of the gaseous stream, the partial pressure of the $CO_2$, and equipment used, but in suitable embodiments be at temperatures ranging from ambient to about 200° C., and at pressures ranging from 1-5 atmospheres.

Illustratively, contacting ionic liquid(s) with a gaseous mixture can be performed by use of conventional liquid absorbers, such as counter-current liquid absorbers or cyclone scrubbers, by permeation through a supported liquid membrane, or by use of a fixed bed.

In one embodiment hereof, a liquid solvent can be used to remove a compound from a gas stream in an absorber, where gas and liquid are brought into contact countercurrently, and the gas is dissolved into the solvent. The absorber is typically equipped with trays or packing to provide a large liquid-gas contact area. Valve and sieve trays may be used, as may bubble cap and tunnel trays, where a tray typically has overflow weirs and downcomers to create hydrostatic holdup of the downward flow of the liquid. Random packings can also be used such as Rashig rings, Pall rings or Berl saddles, or structured packings of woven or nonwoven fabrics of metal, synthetic materials or ceramics.

The purified gas is taken off the head of the column. The solvent laden with the absorbed compound is withdrawn from the bottom of the absorber, routed to a regeneration system where it is freed of absorbed the absorbed gas component, and returned as lean solvent to the absorber. Regeneration may be accomplished by flash regeneration, which can involve pressure reduction and mild reboiling in one or more stages; by inert gas stripping; or by high temperature reboiling wherein the solvent is stripped by its own vapor, which is then condensed from the overhead gas and recycled as reflux.

In an absorber, a batch process may be performed where the flow rate through the vessel correlates to the residence time of contact and is suitably chosen to afford an effluent stream with the desired purification tolerance. To promote the desired intimate mixing, such gas/liquid absorption units also may be operated in a dual flow mode. Such dual flow can be co-current or counter-current. In such an embodiment, the gas mixture and the ionic liquid(s) flow through a purification unit contemporaneously. Methods for carbon dioxide absorption are further discussed in U.S. Pat. No. 6,579,343; U.S. Ser. No. 05/129,598; and U.S. Ser. No. 08/236,390, each of which is by this reference incorporated in its entirety as a part hereof for all purposes.

Where supported liquid membranes are used for gas recovery, the membrane may include a solvent such as an ionic liquid contained within the pores of a solid microporous support, such as a ceramic, metal, or polymeric support. Supported liquid membranes fabricated from supports such as ceramics, metals, and certain heat stable polymers may advantageously be used in higher than ambient temperature operations. Such higher temperature operations may be preferred to effect a more rapid separation, requiring less contact time. In addition, these higher temperature operations may also be a consequence of the process configuration, such as configurations requiring purification of high temperature exhaust gases or other gases exiting high temperature operations. Supported liquid membranes suitable for purifying high temperature gases obviate the need to pre-cool such gases before contact with the supported liquid membrane. The supported liquid membranes may be fabricated as thin films or hollow fibers with continuous networks of interconnected pores leading from one surface to the other. Supported liquid membranes contact a feed gas mixture on one side of the membrane and may effect separation of a gas component from the mixture by allowing that component to escape via permeation or diffusion into the ionic liquid and through the liquid membrane.

Ionic liquid(s) can also be used in a conventional gas/liquid absorption unit-based system comprising a fixed bed. Such systems can be operated in batch mode or continuous flow mode. In a typical batch mode configuration, the ionic liquid(s) is introduced into a vessel followed by introduction of the gas mixture. After a prescribed residence time, the resulting gas is removed, leaving behind an impurity or group of impurities dissolved in the ionic liquid. The batch purified gas can be generated by heating or reduced pressure treatment as described above. To maximize contact of the ionic liquid and the gas mixture, the ionic liquid can be coated on a solid support, such as glass beads, and the like, to increase the surface area of the ionic liquid capable of contacting the gas mixture.

In one embodiment, this invention provides a method wherein the removal of $CO_2$ from a gaseous mixture occurs in a removal apparatus; wherein, in the removal apparatus, $CO_2$ is dissolved into a Formula (I) compound(s) to form (i) a purified fraction that is depleted in $CO_2$ content (compared to the content thereof in the original feed of the gaseous mixture) and (ii) a solvent fraction that is enriched in $CO_2$ content (compared to the content thereof in the original feed of the gaseous mixture); and wherein the solvent fraction is separated from the removal apparatus. In a further alternative embodiment of the methods hereof, $CO_2$ can be separated from the solvent fraction to form a rectified solvent fraction, and the rectified solvent fraction can be returned to the removal apparatus.

Equipment and processes that can be used for the absorption of $CO_2$ are further described in Absorption, *Ullmann's Encyclopedia of Industrial Chemistry* [2002, (Wiley-VCH Verlag GmbH & Co. KGa) Johann Schlauer and Manfred Kriebel, Jun. 15, 2000 (DOI: 10.1002/14356007.b03_08)]; and Absorption, *Kirk-Othmer Encyclopedia of Chemical Technology* [2003, (John Wiley & Sons, Inc), Manuel Laso and Urs von Stockar (DOI:10.1002/0471238961.0102191519201503.a01.pub2)].

Other related N-substituted pyrrolidonium compounds, and methods for using same for carbon dioxide absorption, are disclosed in the concurrently-filed, commonly-assigned applications listed as follows by serial number, attorney docket number and title, each of which is by this reference incorporated in its entirety as a part hereof for all purposes, to-wit:

U.S. application Ser. No. 12/328,057 [(N-Substituted Pyrrolidonium Ionic Liquids)], now U.S. Patent Publication No 2010/0145073 (now U.S. Pat. No. 8,138,354);

U.S. application Ser. No. 12/328,078 [(Functionalized N-Substituted Pyrrolidonium Ionic Liquids)], now U.S. Patent Publication No 2010/0145074 (now U.S. Pat. No. 8,119,818); and U.S. Provisional Application No. 61/119,781 [(N-Substituted Pyrrolidonium Ionic Liquids with Expanded Linker)], now U.S. Patent Publication No 2012/0130088.

EXAMPLES

Compounds provided by this invention, and the advantageous attributes and effects thereof, may be seen in a series of examples as described below. The embodiments of this invention on which the examples are based are representative only, and the selection of those embodiments to illustrate the invention does not indicate that materials, components and reactants, and/or conditions, protocols and regimes, not described in these examples are not suitable for practicing this invention, or that subject matter not described in these examples is excluded from the scope of the appended claims and equivalents thereof.

In the examples, the following abbreviations are used: nuclear magnetic resonance is abbreviated NMR; thermogravimetric analysis is abbreviated TGA, gas chromatography is abbreviated GC; gas chromatography-mass spectrometry is abbreviated GC-MS; thin layer chromatography is abbreviated TLC. Centigrade is abbreviated C, mega Pascal is abbreviated MPa, gram is abbreviated "g", milliliter is abbreviated "mL", hour is abbreviated "hr".

Materials.

The following materials were used in the examples. The commercial reagents and solvents acetonitrile (CAS Registry No. 75-05-8, 99.8% purity), 1-chloropropane (CAS Registry No. 540-54-5, 98% purity), dichloromethane (CAS Registry No. 75-09-2, 99.5% purity), diethyl ether (CAS Registry No. 60-29-7, 99% purity), ethyl levulinate (CAS Registry No. 539-88-8, 99% purity), ethyl acetate (CAS Registry No. 141-78-6, 99.8% purity), levulinic acid (CAS Registry No. 123-76-2, 98% purity), silver (I) oxide (CAS Registry No. 20667-12-3, 99% purity), and N,N-dimethylethylenediamine (CAS Registry No. 108-00-9, 98.0% purity, Fluka product) were obtained from Sigma-Aldrich Chemical Company (Milwaukee, Wis., USA) and used as received without further purification. ESCAT® 142 (5 wt % palladium on activated carbon) catalyst was obtained from Engelhard (now BASF Catalysts, Iselin, N.J.).

Example 1 illustrates a method for the preparation of the 1-(2-(dimethylamino)ethyl)-5-methylpyrrolidin-2-one (MeDMAP) intermediate used in the subsequent preparation of the exemplary ionic liquids.

Example 1

Synthesis of 1-(2-(dimethylamino)ethyl)-5-methylpyrrolidin-2-one (MeDMAP)

1-(2-(dimethylamino)ethyl)-5-methylpyrrolidin-2-one (MeDMAP), $C_9H_{18}N_2O$, with a molecular weight of 170.25 g $mol^{-1}$ and structure as shown in Formula 4, was prepared as follows via the cyclic reductive amination of ethyl levulinate with N,N-dimethylethylenediamine (as described in U.S. Pat. No. 7,157,588):

Formula 4

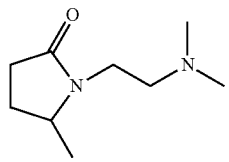

To a 600-mL Hastelloy® C-276 autoclave reactor (Parr Model 2302 HC) equipped with a gas entrainment turbine impellor and electrical heating mantle was added 150.0 g (1.04 mol) ethyl levulinate, 192.6 g (2.18 mol) N,N-dimethylethylenediamine, and 7.5 g ESCAT® 142 5% Pd/C catalyst. The reactor was purged first with nitrogen and then hydrogen, and then pressurized with 50 psig (0.4 MPa) hydrogen and stirred at 600 rpm while heating the reaction mixture to 150° C. On reaching this reaction temperature, the reactor was further pressurized to 1000 psig (7.0 MPa) with hydrogen and maintained at this pressure by adding additional hydrogen as required for the duration of the reaction. After 6 hours at these conditions, the reactor was cooled and vented, and the liquid reaction mixture was recovered for product isolation. The crude mixture was filtered through a glass frit via aspirator vacuum to remove the catalyst followed by removal of byproduct ethanol and unreacted N,N-dimethylethylenediamine in vacuo. The remaining contents were fractionally distilled with a 20-cm Vigreaux column under high vacuum (~0.05 mmHg) to give 136.5 g water-white product at 85° C. in 77% isolated yield. Product purity was >99% as determined by GC/MS (HP-6890 equipped with MSD).

Example 2

Synthesis of 1-(N,N,N-dimethylpropylaminoethyl)-5-methylpyrrolidin-2-one levulinate ([MeDMPAP] [Lev])

1-(N,N,N-dimethylpropylaminoethyl)-5-methyl pyrrolidone-2-one levulinate ([MeDMPAP] [Lev]), $C_{17}H_{32}N_2O_4$, with a molecular weight of 328.45 g $mol^{-1}$ and structure as shown in Formula 5, was prepared as follows:

Formula 5

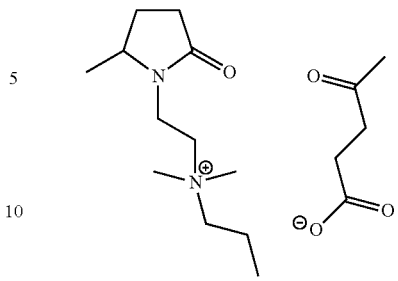

1-(2-(dimethylamino)ethyl)-5-methylpyrrolidin-2-one (MeDMAP), $C_9H_{18}N_2O$, with a molecular weight of 170.25 g $mol^{-1}$ and a purity of >99% by GC/MS, was used as prepared in Example 1. To a two-neck 100-mL round bottom flask equipped with a nitrogen-purged reflux condenser was added 18.30 g (0.108 moles) MeDMAP, 16.66 g (0.212 moles) 1-chloropropane, and 28.39 g acetonitrile as reaction solvent. The condenser was cooled by a recirculating bath filled with a 50 wt % mixture of water and propylene glycol maintained at approximately 16° C. The reaction mixture was heated to 85° C. under reflux and nitrogen purge with a temperature-controlled oil bath. This reaction temperature was maintained for 66 hrs, at which time the conversion of the MeDMP was about 78% by $^1H$ NMR spectroscopy. The reaction mixture was then thermally quenched and dried under high vacuum (approximately $10^{-6}$ torr) using a turbomolecular pump and heating the material to about 70-80° C. overnight. The intermediate product of this reaction, 1-(N,N,N-dimethylpropylaminoethyl)-5-methyl pyrrolidone-2-one chloride ([MeDMPAP] [Cl]), $C_{12}H_{25}N_2OCl$, with a molecular weight of 248.79 g $mol^{-1}$, was then extracted with multiple diethyl ether extractions (approximately 300 mL in 30-50 mL increments) to remove starting materials, giving a final purity of about 97% [MeDMPAP] [Cl] by $^1H$ NMR spectroscopy. This chloride salt was dissolved in dichloromethane, stirred with activated carbon overnight, poured through a column packed with neutral and acidic alumina, and then washed with methanol. The final purity of this chloride salt intermediate was approximately 99% by $^1H$ NMR spectroscopy.

In a 500-mL Erlenmeyer flask, 5.031 g (0.0202 mol) of this [MeDMPAP] [Cl] intermediate was dissolved in approximately 150 mL of purified water. This solution was to added a slurry of 2.372 g (0.102 mol) silver(I) oxide and 2.596 g (0.0224 mol) levulinic acid in approximately 200 mL of purified water. After stirring overnight at room temperature, the reaction mixture was filtered through a fitted funnel containing Celite® to remove the silver chloride product and residual silver(I) oxide. Water was removed from the filtrate in vacuo with a rotary evaporator, then the product was twice dissolved in methanol, filtered through a fritted funnel containing Celite® to remove residual silver chloride and silver(I) oxide, and then evaporated in vacuo with a rotary evaporator to remove the methanol solvent. The product was then dried under high vacuum (approximately $10^{-5}$ torr) using a turbomolecular pump and heating the material to about 70° C. for two days. The resulting [MeDMPAP] [Lev] product purity was 98.8% by $^1H$ NMR spectroscopy.

Example 3

Solubility of $CO_2$ in [MeDMPAP] [Lev]

In the following solubility study, the following nomenclature and abbreviations are used:

$\alpha_i$=generic RK EOS parameter of the i-th species ($m^6 \cdot MPa \cdot mol^{-2}$)
$b_i$=generic RK EOS parameter of i-th species ($m^3 \cdot mol^{-1}$)
C=concentration ($mol \cdot m^{-3}$)
$C_b$=buoyancy force (N)
$C_f$=correction factor (kg)
$C_{pi}^0$=ideal gas heat capacity of i-th species ($J \cdot mol^{-1} \cdot K^{-1}$)
$C_0$=initial concentration ($mol \cdot m^{-3}$)
$C_s$=saturation concentration ($mol \cdot m^{-3}$)
<C>=space-averaged concentration ($mol \cdot m^{-3}$)
COP=coefficient of performance
D=diffusion constant ($m^2 \cdot s^{-1}$)
g=gravitational acceleration (9.80665 $m \cdot s^{-2}$)
$f$=mass flow rate ratio
$f(T)$=temperature dependent term of binary interaction parameter, $1+\tau_{ij}/T$
$H_i$=enthalpy at point i ($J \cdot kg^{-1}$)
$k_{ij}, k_{ji}, l_{ij}, l_{ji}$=binary interaction parameters
L=length (m)
$m_\alpha$=mass absorbed (kg)
$m_i$=mass of i-th species on sample side of balance (kg)
$m_j$=mass of j-th species on counterweight side of balance (kg)
$m_{ij}$=binary interaction parameter
$m_s$=mass flow rate of solution ($kg \cdot sec^{-1}$)
$m_r$=mass flow rate of refrigerant ($kg \cdot sec^{-1}$)
$m_{IL}$=mass of ionic liquid sample (kg)
$MW_i$=molecular weight of i-th species ($kg \cdot mol^{-1}$)
N=n-th number component
P=pressure (MPa)
$P_{ci}$=critical pressure of i-th species (MPa)
$P_0$=initial pressure (MPa)
$Q_i$=heat (kW)
R=gas constant (8.31434 $m^3 \cdot Pa \cdot mol^{-1} \cdot K^{-1}$)
t=time (s)
$T_{ci}$=critical temperature of i-th species (K)
$T_i$=temperature of i-th species (K)
$T_j$=temperature of j-th species (K)
$T_s$=temperature of sample (K)
$V_i$=volume of i-th species ($m^3$)
$V_{IL}$=volume of ionic liquid ($m^3$)
$V_m$=liquid sample volume ($m^3$)
$\bar{V}_g$=molar volume of gas ($m^3 \cdot mol^{-1}$)
$\bar{V}_i$=molar volume of i-th species ($m^3 \cdot mol^{-1}$)
$\bar{V}_{IL}$=molar volume of ionic liquid ($m^3 \cdot mol^{-1}$)
$\bar{V}_m$=molar volume of mixture ($m^3 \cdot mol^{-1}$)
$\bar{V}_0$=initial molar volume ($m^3 \cdot mol^{-1}$)
$\Delta \bar{V}$=change in molar volume ($m^3 \cdot mol^{-1}$)
$W_i$=work (kW)
$x_i$=mole fraction of i-th species
z=depth (m)
$\alpha$=EOS temperature dependence parameter
$\beta_k$=coefficient of temperature dependence parameter
$\lambda_n$=eigenvalue ($m^{-1}$)
$\rho_g$=density of gas ($kg \cdot m^{-3}$)
$\rho_i$=density of i-th component on sample side of balance ($kg \cdot m^{-3}$)
$\rho_j$=density of j-th component on counter weight side of balance ($kg \cdot m^{-3}$)
$\rho_{air}$=density of air ($kg \cdot m^{-3}$)
$\rho_s$=density of sample ($kg \cdot m^{-3}$)
$\eta$=heat ratio, output power divided by input power
$\tau_{ij}$=binary interaction parameter (K) for temperature dependence term, $f(T)$ Units
Pa≡Pascal
MPa≡Mega Pascal
mol≡mole
m≡meter
cm≡centimeter
kW≡kilowatt
K≡Kelvin
N≡Newton
J≡Joule
kJ≡kilojoule
kg≡kilogram
mg≡milligram
μg≡microgram
T≡temperature
P≡pressure
mbar≡millibar
min ≡minute
° C.≡degrees centigrade
sec≡second The gas solubility and diffusivity measurements were made using a gravimetric microbalance (Hiden Isochema Ltd, IGA 003, Warrington, UK). The IGA design integrates precise computer-control and measurement of weight change, pressure and temperature to enable fully automatic and reproducible determination of gas adsorption-desorption isotherms and isobars. The microbalance consists of an electrobalance with sample and counterweight components inside a stainless steel pressure-vessel. The balance has a weigh range of 0-100 mg with a resolution of 0.1 μg. An enhanced pressure stainless steel (SS316LN) reactor capable of operation to 20.0 bar and 100° C. is installed.

Approximately 60 mg of the ionic liquid sample was added to the sample container and the reactor was sealed. The sample was dried and degassed by first pulling a course vacuum on the sample with a diaphragm pump (Pfeiffer, model MVP055-3, Asslar, Germany) and then fully evacuating the reactor to $10^{-8}$ bar with a turbopump (Pfeiffer, model TSH-071). While under deep vacuum, the sample was heated to 75° C. for 10 hr with an external water jacket connected to a remote-controlled constant-temperature bath (Huber Ministat, model cc-S3, Offenburg, Germany). A 30 percent ethylene glycol and 70 percent water mixture by volume was used as the recirculating fluid. The sample mass slowly decreased as residual water and gases were removed. Once the mass had stabilized for at least 60 min, the sample dry mass was recorded. The percent weight loss for the [MeDMPAP] [Lev] ionic liquid sample tested was about 2.3%.

The IGA003 can operate in both dynamic and static mode. Dynamic mode operation provides a continuous flow of gas (max. 500 $cm^3$ $min^{-1}$) past the sample and the exhaust valve controls the set-point pressure. Static mode operation introduces gas into the top of the balance away from the sample and both the admittance and exhaust valves control the set-point pressure. All absorption measurements were performed in static mode. The sample temperature was measured with a type K thermocouple with an accuracy of ±0.1° C. The thermocouple was located inside the reactor next to the sample container. The water jacket maintained the set-point temperature automatically to within a typical regulation accuracy of ±0.1° C. One isotherm at 25° C. was measured. Once this temperature was achieved and stable, the admittance and exhaust valves automatically opened and closed to adjust the pressure to the first set-point.

Pressures from $10^{-9}$ to $10^{-1}$ bar were measured using a capacitance manometer (Pfeiffer, model PKR251), and pressures from $10^{-1}$ to 20.0 bar were measured using a piezo-resistive strain gauge (Druck, model PDCR4010, New Fairfield, Conn.). Regulation maintained the reactor pressure set-point to within ±4 to 8 mbar. The pressure ramp rate was set at 200 mbar $min^{-1}$. The upper pressure limit of the stainless steel reactor was 20.0 bar, and several isobars up to 20 bar (i.e., 0.1, 0.5, 1, 4, 7, 10, 13, 15, and 20 bar) were measured. To ensure sufficient time for gas-liquid equilibrium, the ionic liquid samples were maintained at set-point for a minimum of 3 hr with a maximum time-out of 8 hr.

The IGA method exploits the relaxation behavior following a pressure change to simultaneously evaluate the time-dependent absorption and asymptotic uptake. The real-time processor was used to determine the end-point. The percent relaxation used as an end point for the real-time analysis was 99 percent. The minimum weight change for real-time analysis was set at 1 μg, the acceptable average deviation of the model from the acquired data was set at 7 μg, and the target interval for weight acquisition was set at a typical value of 1 μg. The temperature variation during was maintained less than $0.1°$ C. $min^{-1}$.

Safety features of the IGA003 included a pressure relief valve and over-temperature control for the reactor. The factory-installed relief valve was replaced with a DuPont guideline relief valve (Circle-Seal, set-point pressure 24.5 bar; DuPont, Wilmington, Del.). To further protect the microbalance system from over-pressure, additional relief valves were installed on the custom gas manifold and on the $CO_2$ gas cylinder; these relief valves were set to open if the pressure exceeded 25 bar. The reactor over-temperature interlock controller that comes standard on the IGA003 was set to turn off the water bath if the temperature exceeded $100°$ C. The IGA003 was mounted inside a custom stainless steel cabinet purged with nitrogen to minimize the possibility of a flame with some gases measured with this apparatus in other applications.

Thermogravimetric measurements were corrected for a number of gravitational balance forces introduced at high pressure as described by Pinkerton, E. P., et al. (High-pressure gravimetric measurement of hydrogen capacity in vapor-grown carbon nanofibers and related materials; Proceedings of the $11^{th}$ Canadian Hydrogen Conference, Victoria, BC (2001) pages 633-642). These included:
(1) Changes in the buoyant forces due to changes in temperature.
(2) Aerodynamic drag forces created by the flow of gases.
(3) Changes in the balance sensitivity due to changes in pressure.
(4) Volumetric changes in the samples due to expansivity.

These gravitational balance forces are often of the same order of magnitude (0.1 to 5 mg) as the overall weight change in the sample and can lead to inaccurate results if not accounted for precisely. Distinguishing mass changes with an accuracy of 0.01 wt. % on small and sometimes limited sample quantities requires knowledge of the sample weight to within about 5 to 10 μg.

The buoyancy correction follows from Archimedes' principal: there is an upward force exerted on an object equivalent to the mass of fluid displaced. The upward force ($C_b$) due to buoyancy is calculated using equation 1 where the mass of the gas displaced is equivalent to the volume of the submersed object ($V_i$) times the density ($\rho_g$) of the gas at a given (T,P) and the gravitational acceleration (g). If the volume of the object remains constant, $V_i$ can be calculated by knowing the mass ($m_i$) and density ($\rho_i$) of the object.

$$C_b = \text{Buoyancy} = gV_i\rho_g(T,P) = g\frac{m_i}{\rho_i}\rho_g(T,P) \quad (1)$$

Instead of using the gas densities provided in the Hiden Isochema IGA software, the gas density for $CO_2$ was calculated using a computer program (Refprop v.7) developed by the National Institute of Standards and Technology (NIST) (Lemmon, E. W.; McLinden, M. O.; Huber, M. L. NIST reference fluid thermodynamic and transport properties—REFPROP, version 7.0, users' guide. U.S. Department of Commerce, Technology Administration, National Institute of Standards and Technology, Standard Reference Data Program, Gaithersburg, Md., 2002).

The buoyancy correction using the IGA003 system involves a number of additional components for weighing the sample. The arrangement of these components leads to a mass balance as shown by equation 2. This expression accounts for the summation of all components as well as the contribution of the absorbed gas mass ($m_a$) and a correction factor ($C_f$) which accounts for the balance sensitivity to T, P. The density of air ($\rho_{air}$) at ambient temperature and pressure was subtracted from $\rho_i$ and $\rho_j$ because the components were initially weighed in air.

$$\sum_{i=1} m_i - \sum_{j=1} m_j - \sum_{i=1} \frac{m_i}{\rho_i}\rho_g(T_i,P) + \sum_{j=1} \frac{m_j}{\rho_j}\rho_g(T_j,P) + m_{IL} + m_a - \frac{m_{IL}}{\rho_s(T_s)}\rho_g(T_s,P) - \frac{m_a}{\rho_a(T_s)}\rho_g(T_s,P) - C_f(T_s,P) = \text{reading} \quad (2)$$

The largest contributions in equation 2 are typically those of the sample container, sample, and counterweight; the other referenced components contribute less because of their larger densities (denominators in equation 2). The physical density of the ionic liquid was measured using a Micromeritics Accupyc 1330 helium pycnometer with an accuracy of ±0.001 g $cm^{-3}$ (Micromeritics Instrument Corp., Norcross, Ga.). Initially, the volume ($V_{IL}$) of the sample was calculated from its pycnometric density ($\rho_s$) and dry mass sample weight ($\rho_s$), but volumetric expansion ($\Delta V/V_0$) due to the gas absorption was later taken into account as described below to more accurately determine the buoyancy effect.

The system was operated in static mode that essentially eliminates any aerodynamic drag forces due to flowing gases. Electrobalances are sensitive to temperature and pressure fluctuations on the beam arm and internal electronics. To minimize this effect, the balance electronics are heated externally with a band heater to a temperature of $45±0.1°$ C. In addition, the individual component temperatures are measured for the sample ($T_s$) and estimated for all others. Therefore, a correction factor ($C_f$) was determined as a function of T, P by measuring the buoyancy effect without a sample and calculating a least-squares fit to tare the balance. The correction factor was on the order of 0.1 to 0.3 mg and increased as expected with decreasing temperature and increasing pressure.

Initially the ionic liquid sample volume was considered to be constant and the mole fraction solubility calculated without taking into account buoyancy effects due to sample expansivity. In order to make a proper buoyancy correction due to the liquid volume change, a simple mole fraction average for the molar volume, $\overline{V}_m$, was used.

$$\overline{V}_m(T,P) = \overline{V}_{IL}(1-x) + \overline{V}_g x, \quad (3)$$

where $\overline{V}_i = MW_i/\rho_i$ and x represents the molar fraction of gas in the solution.

$$V_m(T, P) = \tilde{V}_m(T, P)\left[\left(\frac{m_{IL}}{MW_{IL}}\right) + \left(\frac{m_g}{MW_g}\right)\right] \quad (4)$$

$$\frac{m_s}{\rho_s(T_s)}\rho_g(T_s, P) + \frac{m_a}{\rho_a(T_s)}\rho_g(T_s, P) = V_m(T, P)\rho_g(T, P) \quad (5)$$

As a first approximation, equations 3 and 4 were used to estimate the change in the liquid sample volume, $V_m$, at the measured T, P conditions. Equation 5 can be substituted into equation 2 to account for the buoyancy change with respect to sample expansivity.

1-(N,N,N-dimethylpropylaminoethyl)-5-methylpyrrolidin-2-one levulinate ([MeDMPAP] [Lev]), $C_{17}H_{32}N_2O_4$, with a molecular weight of 328.45 g mol$^{-1}$, was used as prepared in Example 2 with a purity of 98.8% by $^1$H NMR spectroscopy. This material was degassed in situ on the microbalance as described above prior to making solubility measurements. A solubility study was conducted isothermally at 25° C. over a pressure range from 0 to 20 bar where the solubilities ($X_{meas}$) were measured using the gravimetric microbalance as described above. Measured results are reported in Table I.

TABLE 1

Measured Solubility of $CO_2$ in [MeDMPAP] [Lev] at 25° C.

| Pressure (bar) | $X_{meas}$. (mol. fraction) |
|---|---|
| 0.00 | 0.0000 |
| 0.10 | 0.0174 |
| 0.50 | 0.0484 |
| 1.00 | 0.0780 |
| 4.00 | 0.1482 |
| 7.00 | 0.2185 |
| 10.00 | 0.2703 |
| 13.00 | 0.3186 |
| 15.00 | 0.3494 |
| 20.00 | 0.4010 |

Where a range of numerical values is recited or established herein, the range includes the endpoints thereof and all the individual integers and fractions within the range, and also includes each of the narrower ranges therein formed by all the various possible combinations of those endpoints and internal integers and fractions to form subgroups of the larger group of values within the stated range to the same extent as if each of those narrower ranges was explicitly recited. Where a range of numerical values is stated herein as being greater than a stated value, the range is nevertheless finite and is bounded on its upper end by a value that is operable within the context of the invention as described herein. Where a range of numerical values is stated herein as being less than a stated value, the range is nevertheless bounded on its lower end by a non-zero value.

In this specification, unless explicitly stated otherwise or indicated to the contrary by the context of usage, amounts, sizes, ranges, formulations, parameters, and other quantities and characteristics recited herein, particularly when modified by the term "about", may but need not be exact, and may also be approximate and/or larger or smaller (as desired) than stated, reflecting tolerances, conversion factors, rounding off, measurement error and the like, as well as the inclusion within a stated value of those values outside it that have, within the context of this invention, functional and/or operable equivalence to the stated value.

What is claimed is:

1. A method for the removal of $CO_2$ from a gaseous mixture comprising contacting the gaseous mixture with one or more compounds represented by the structure of the following Formula I:

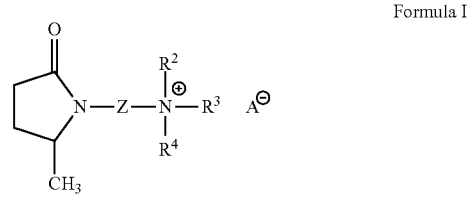

Formula I wherein
(a) Z is —$(CH_2)_n$—, wherein n is an integer from 2 to 12, or Z is —$[(CH_2)_b$—O$]_c$—$(CH_2)_d$— wherein b and d are each independently integers from 1 to 4, and c is an integer from 1 to 8;
(b) $R^2$ and $R^3$ are each independently H or a $C_1$ to $C_6$ straight-chain or branched alkyl group;
(c) $R^4$ is H, a $C_1$ to $C_6$ straight-chain or branched alkyl group, or —$[(CH_2)_p$—X$]_q$—$(CH_2)_r$—Y—$R^6$ wherein X and Y are each independently O or $NR^6$, p and r are each independently an integer from 1 to 4, q is an integer from 0 to 8, and $R^6$ is H or a $C_1$ to $C_6$ straight-chain or branched alkyl group; and
(d) $A^-$ is an anion selected from the members of the group consisting of levulinate, $[BF_4]^-$, $[PF_6]^-$, $[SbF_6]^-$, $[CH_3CO_2]^-$, $[HSO_4]^-$, $[CF_3SO_3]^-$, $[HCF_2CF_2SO_3]^-$, $[CF_3HFCCF_2SO_3]^-$, $[CF_3$—O—$CFHCF_2SO_3]^-$, $[CF_3CF_2OCFHCF_2SO_3]^-$, $[CF_3CF_2CF_2OCFHCF_2SO_3]^-$, $[HCClFCF_2SO_3]^-$, $[(CF_3SO_2)_2N]^-$, $[AlCl_4]^-$, $[CF_3CO_2]^-$, $[NO_3]^-$, $[SO_4]^{2-}$, $Cl^-$, $Br^-$, $I^-$, and $F^-$.

2. The method of claim 1 wherein Z is —$(CH_2)_n$—.

3. The method of claim 2 wherein n is an integer from 2 to 6.

4. The method of claim 2 wherein n is 2.

5. The method of claim 1 wherein $R^4$ is H, $C_1$ to $C_6$ straight-chain or branched monovalent alkyl.

6. The method of claim 5 wherein $R^2$, $R^3$ and $R^4$ taken independently are H, —$CH_3$, —$CH_2CH_3$, or —$CH_2CH_2CH_3$.

7. The method of claim 1 wherein $A^-$ is levulinate.

8. The method of claim 1 wherein $A^-$ is selected from the members of the group consisting of $[BF_4]^-$, $[PF_6]^-$, $[SbF^6]^-$, $[CH_3CO_2]^-$, $[HSO_4]^-$, $[CF_3SO_3]^-$, $[HCF_2CF_2SO_3]^-$, $[CF_3HFCCF_2SO_3]^-$, $[CF_3$—O—$CFHCF_2SO_3]^-$, $[CF_3CF_2OCFHCF_2SO_3]^-$, $[CF_3CF_2CF_2OCFHCF_2SO_3]^-$, $[HCClFCF_2SO_3]^-$, $[(CF_3SO_2)_2N]^-$, $[AlCl_4]^-$, $[CF_3CO_2]^-$, $[NO_3]^-$, $[SO_4]^{2-}$, $Cl^-$, $Br^-$, $I^-$, and $F^-$.

9. The method of claim 1 wherein Z is —$[(CH_2)_b$—O$]_c$—$(CH_2)_d$—.

10. The method of claim 9 wherein c is 1, and b and d are 2.

11. The method of claim 9 wherein c is 2, and b and d are 2.

12. The method of claim 1 wherein $R^4$ is —$[(CH_2)_p$—X$]_q$—$(CH_2)_r$—Y—$R^6$.

13. The method of claim 12 wherein X and Y are O.

14. The method of claim 12 wherein X and Y are $NR^6$.

15. The method of claim 12 wherein r and p are 2 to 4.

16. The method of claim 12 wherein r and p are 2.

17. The method of claim 12 wherein q is 0 to 4.

18. The method of claim 12 wherein $R^4$ is —$(CH_2)_2$—O—$(C_2H_5)$, —$(CH_2)_2$—O—$(CH_3)$, or —$(CH_2)_2$—OH.

19. The method of claim 1 wherein the removal of CO2 from the gaseous mixture occurs in a removal apparatus; wherein, in the removal apparatus, $CO_2$ is dissolved into a Formula (I) compound(s) to form (i) a purified fraction that is depleted in $CO_2$ content and (ii) a solvent fraction that is enriched in $CO_2$ content; and wherein the solvent fraction is separated from the removal apparatus.

20. The method of claim 19 wherein $CO_2$ is separated from the solvent fraction to form a rectified solvent fraction, and the rectified solvent fraction is returned to the removal apparatus.

* * * * *